United States Patent
Huang et al.

(10) Patent No.: US 7,782,559 B2
(45) Date of Patent: Aug. 24, 2010

(54) CAMERA MODULE

(75) Inventors: Ching-Hsing Huang, Taipei Hsien (TW); Cheng-Fa Weng, Taipei Hsien (TW); Jen-Te Wang, Taipei Hsein (TW); Huai-Chao You, Shenzhen (CN); Da-Yi Wen, Shenzhen (CN)

(73) Assignees: Fu Zhun Precision Industry (Shen Zhen) Co., Lt.d, Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 195 days.

(21) Appl. No.: 12/189,805

(22) Filed: Aug. 12, 2008

(65) Prior Publication Data

US 2009/0268316 A1 Oct. 29, 2009

(30) Foreign Application Priority Data

Apr. 28, 2008 (CN) .......................... 2008 1 0066694

(51) Int. Cl.
  *G02B 7/02* (2006.01)
  *G02B 15/14* (2006.01)
  *G03B 3/10* (2006.01)
  *G03B 17/26* (2006.01)

(52) U.S. Cl. ...................... 359/824; 359/814; 359/811; 359/823; 359/696; 396/133; 396/528; 396/529; 310/13; 348/208.11; 348/335; 348/345

(58) Field of Classification Search ................ 359/198, 359/811, 814, 819, 822–824, 827, 694, 696; 310/12–15, 17; 396/85, 89, 133, 219, 257, 396/529; 348/208.11, 335, 345; 369/44.14–44.16, 369/44.22, 44.27, 112.23; 720/682, 683
See application file for complete search history.

(56) References Cited

U.S. PATENT DOCUMENTS

| 5,298,318 | A  | * | 3/1994  | Soules et al. ................ 442/180 |
| 5,572,372 | A  | * | 11/1996 | Sekine et al. ............... 359/824 |
| 7,203,011 | B2 | * | 4/2007  | Ito et al. ..................... 359/811 |
| 7,221,526 | B2 | * | 5/2007  | Manabe ...................... 359/824 |
| 7,271,511 | B2 | * | 9/2007  | Osaka ...................... 310/12.27 |
| 7,274,120 | B2 | * | 9/2007  | Manabe ................... 310/12.04 |
| 7,285,879 | B2 | * | 10/2007 | Osaka ..................... 310/12.02 |
| 7,542,222 | B2 | * | 6/2009  | Yasuda ....................... 359/827 |
| 7,586,702 | B1 | * | 9/2009  | Huang et al. ................ 359/824 |
| 2006/0153556 | A1 | * | 7/2006 | Lee et al. ................... 396/133 |
| 2006/0181748 | A1 |   | 8/2006 | Makii et al. |
| 2008/0192124 | A1 | * | 8/2008 | Nagasaki ............... 348/208.11 |
| 2009/0252489 | A1 | * | 10/2009 | Huang et al. ............... 396/529 |
| 2009/0290241 | A1 | * | 11/2009 | Huang et al. ............... 359/824 |

* cited by examiner

*Primary Examiner*—Loha Ben
(74) *Attorney, Agent, or Firm*—Frank R. Niranjan (57) ABSTRACT

A camera module includes a lens unit, a magnet, a stator and an elastic element. The stator includes an upper coil seat with an upper coil wound therearound and a lower coil seat with a lower coil wound therearound. The upper and the lower coils establish an induced magnetic field when electric currents are applied thereto. The induced magnetic field interacts with the magnet to generate a magnetic force driving the lens unit into a telescopic movement. The elastic element includes a plurality of ribs. Each rib includes a fixed end connected with the stator and an opposite movable end. The moveable end moves together with the lens unit with respect to the fixed end to cause the ribs to deform and generate an elastic force. The lens unit stops at a focal position when the magnetic force and the elastic force come to a balance.

16 Claims, 10 Drawing Sheets

CAMERA MODULE

BACKGROUND

1. Technical Field

The present invention relates to camera modules, and particularly to a camera module for use in a digital camera or a portable electronic apparatus such as a mobile telephone, a personal digital assistant, etc.

2. Description of Related Art

Camera modules are generally installed in mobile telephones, personal digital assistants or other portable electronic apparatuses to record the memorable moments due to their convenience and practicality. The designs of the camera modules have evolved toward lightweight and compactness tendency, so have the currently popular digital camera modules.

In the art, a two-step type camera module is proposed. The camera module generally includes a lens and a motor for driving the lens into telescopic movement. When the camera module operates, the lens is driven by the motor to move from a near focal point to a far focal point.

However, during the telescopic movement of the lens, the lens is driven by the motor to directly move from the near focal point to the far focal point. This kind of camera module has only two focal points, i.e., the near focal point and the far focal point. The lens cannot be precisely driven by the motor to stop at a precise position between the near focal point and the far focal point. Such a shortcoming needs to be solved.

SUMMARY

The present invention relates to a camera module. According to an exemplary embodiment of the present invention, the camera module includes a lens unit, a magnet, a stator and an elastic element. The lens unit includes a lens barrel and a lens received in the lens barrel. The magnet is fixedly mounted around the lens barrel. The stator receives the lens unit and the magnet therein. The stator includes an upper coil seat with an upper coil wound therearound and a lower coil seat with a lower coil wound therearound. The upper and the lower coils establish an induced magnetic field when electric currents are applied thereto. The induced magnetic field of the upper and the lower coils interacts with a magnetic field of the magnet to generate a magnetic force driving the lens unit into a telescopic movement. The elastic element includes at least one rib. The at least one rib includes a fixed end connected with the stator and an opposite movable end. The moveable end of the elastic element moves together with the lens unit with respect to the fixed end of the elastic element to cause the at least one rib to deform and generate an elastic force during the telescopic movement of the lens unit. The lens unit stops at a focal position when the magnetic force and the elastic force come to a balance.

Other advantages and novel features of the present invention will become more apparent from the following detailed description of embodiment when taken in conjunction with the accompanying drawings.

DETAILED DESCRIPTION OF THE EMBODIMENTS

Reference will now be made to the drawings to describe the various present embodiments in detail.

Figure 1:
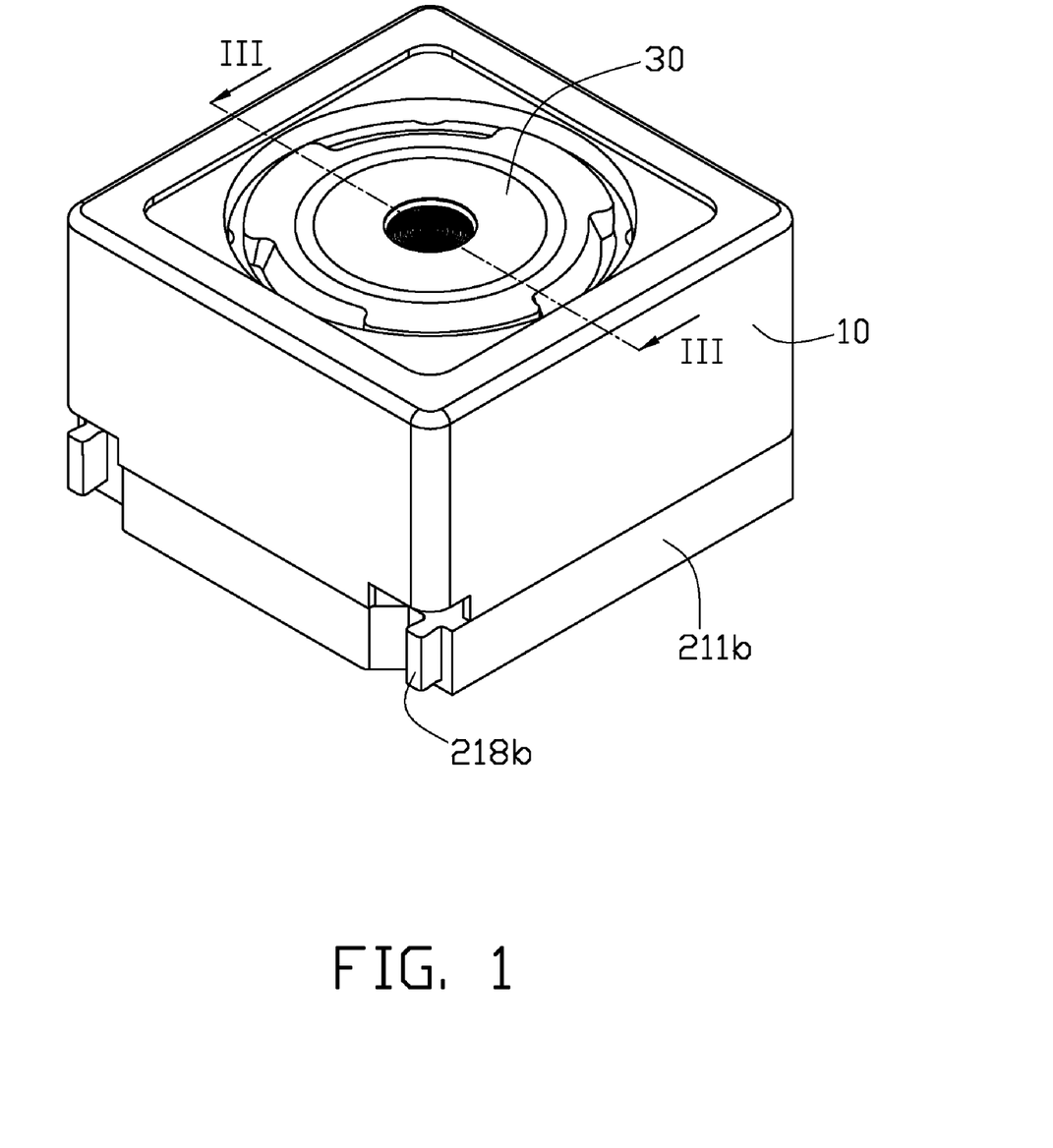
FIG. 1 is an assembled, isometric view showing a camera module in accordance with a first exemplary embodiment of the present invention.
Figure 2:
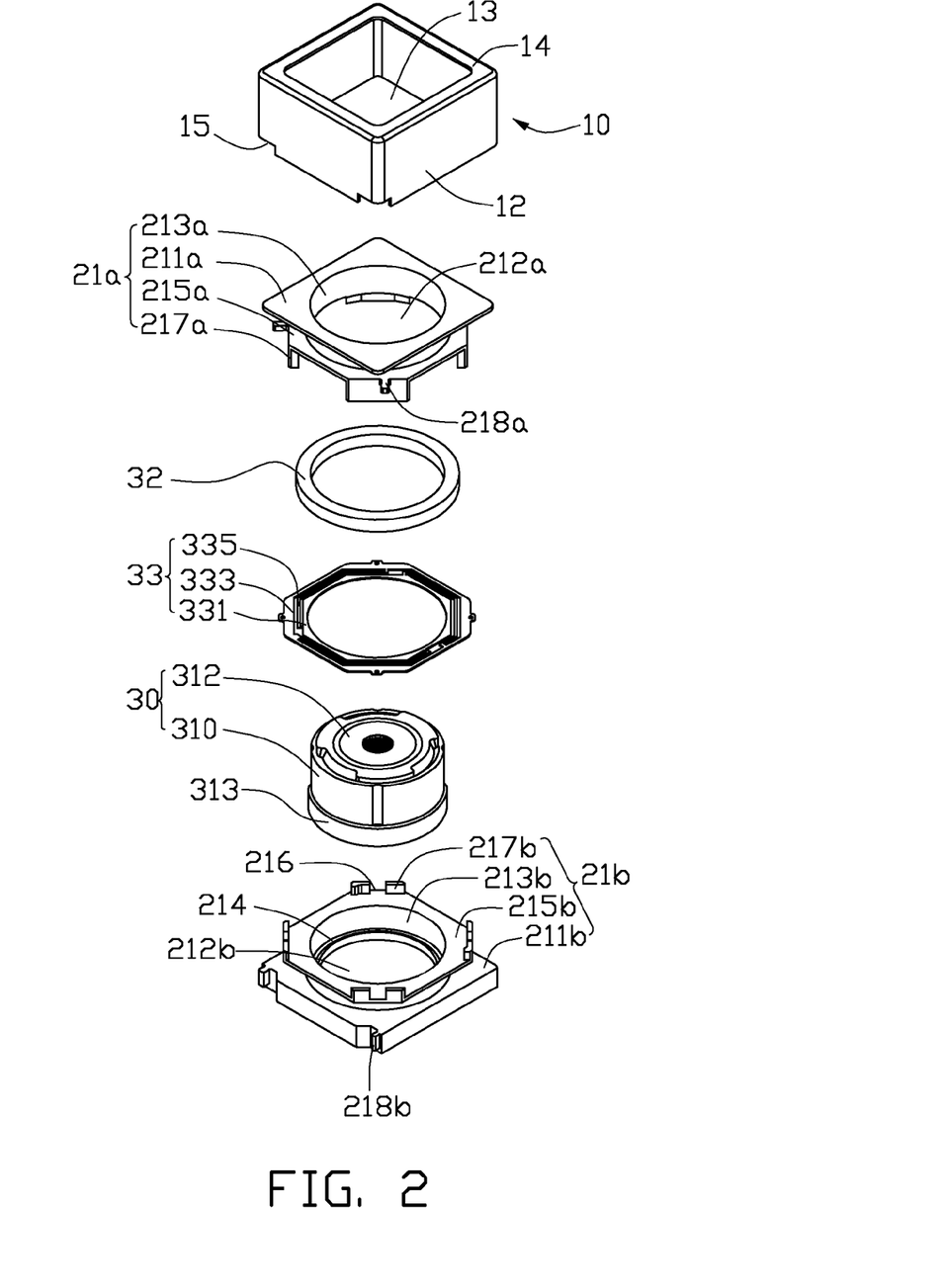
FIG. 2 is an exploded, isometric view of the camera module of FIG. 1.
Figure 3:
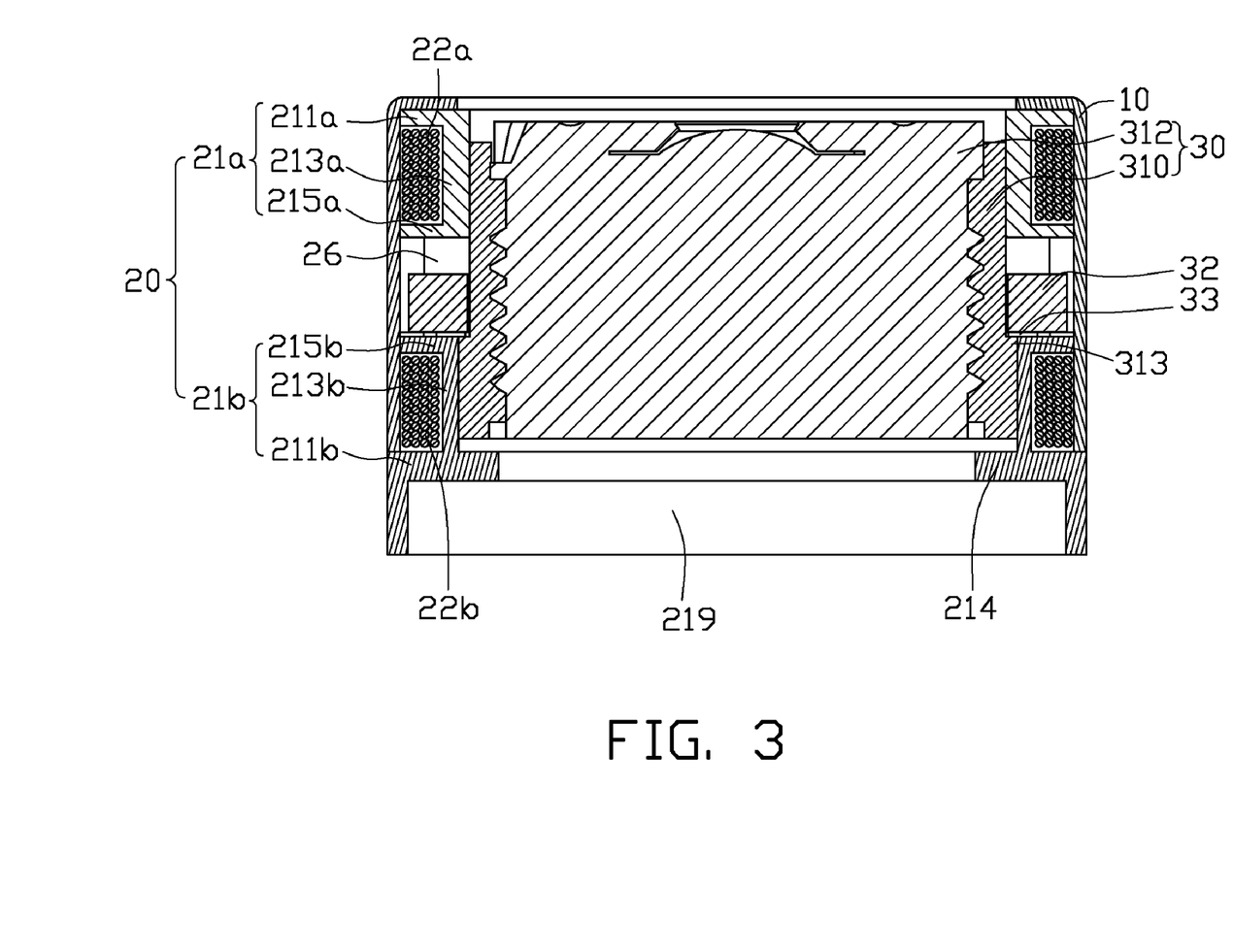
FIG. 3 is a cross-section view of the camera module of FIG. 1, taken along line III-III thereof.

Referring to FIGS. 1-3, a camera module according to a first exemplary embodiment of the present invention includes a lens mount 10, a lens unit 30 and a stator 20. The lens unit 30 and the stator 20 are received in the lens mount 10. The stator 20 is mounted around the lens unit 30 for driving the lens unit 30 into telescopic movement.

The lens mount 10 includes a rectangular sidewall 12 and a top rim 14 inwardly extending from a top end of the sidewall 12. The lens mount 10 is hollow and has a rectangular cross-section with top and bottom opened ends. A space 13 is thus defined in the lens mount 10 for receiving the lens unit 30 and the stator 20 therein. Two cutouts 15 are defined in two neighboring corners of the bottom end of the sidewall 12.

The stator 20 includes an upper coil seat 21a with an upper coil 22a wound therearound and a lower coil seat 21b with a lower coil 22b wound therearound. Both the upper coil seat 21a and the lower coil seat 21b are made of plastic, such as liquid crystalline polymer (LCP).

The upper coil seat 21a includes a cylindrical sidewall 213a, a top plate 211a radially and outwardly extending from a top end of the sidewall 213a and a flange 215a radially and outwardly extending from a bottom end of the sidewall 213a. The upper coil seat 21a defines an inner space 212a in a central portion thereof. The flange 215a of the upper coil seat 21a is octagon-shaped, and four ears 217a perpendicularly and downwardly extend from four spaced sides of an outer periphery of the flange 215a towards the lower coil seat 21b. Two guiding pins 218a radially and outwardly extend from top ends of two neighboring ears 217a, for allowing two ends of the upper coil 22a to be wounded therearound, respectively.

The lower coil seat 21b includes a cylindrical sidewall 213b, a flange 215b radially and outwardly extending from a top end of the sidewall 213b and a square-shaped base 211b formed on a bottom end of the sidewall 213b. An annular protrusion 214 inwardly and horizontally extends from an inner periphery of a top end of the base 211b. The lower coil seat 21b defines an inner space 212b in a central portion thereof. The flange 215b of the lower coil seat 21b is octagon-shaped, and four pairs of ears 217b perpendicularly and upwardly extend from four spaced sides of an outer periphery of the flange 215b towards the upper coil seat 21a. Each pair of the ears 217b defines a groove 216 in a center thereof. Two cutouts (not labeled) are defined in two neighboring corners of the base 211b and positioned at opposite ends of a front lateral sidewall of the base 211b. A pair of guiding pins 218b outwardly extend from the opposite ends of the front lateral sidewall of the base 21b and respectively extend into the cutouts. The guiding pins 218b are used for allowing two ends of the lower coil 22b to be wounded therearound, respectively.

Referring to FIG. 3, the inner space 212a of the upper coil seat 21a and the inner space 212b of the lower coil seat 21b cooperatively form a receiving space (not labeled) between the upper coil seat 21a and the lower coil seat 21b for receiving the lens unit 30 therein. The upper coil seat 21a and the lower coil seat 21b are separated a distance from each other by the ears 217a, 217b, and an annular receiving room 26 is formed between the flanges 215a, 215b of the upper coil seat 21a and the lower coil seat 21b. The receiving room 26 is located around a middle portion of the receiving space and communicates with the receiving space. The base 211b and the annular protrusion 214 cooperatively form an inner space 219 for receiving an image sensor (not shown) of the camera module therein. The image sensor is either a charge coupled device (CCD) sensor or a complementary metal oxide semiconductor (CMOS) sensor.

The lens unit 30 includes a tubular lens barrel 310 and a substantially cylindrical lens 312 fixedly received in the lens barrel 310. An outer diameter of a top end of the lens barrel 310 is smaller than an outer diameter of a bottom end of the lens barrel 310. An annular supporting step 313 is thus formed on an outer circumferential surface of the lens barrel 310 between the top end and the bottom end. A plurality of first screw threads (not labeled) are formed on an inner surface of the lens barrel 310. A plurality of the second screw threads (not labeled) are formed on an outer circumferential surface of the lens 312. The first screw threads are screwed into the second screw threads to connect the lens barrel 310 and the lens 312 together.

An annular magnet 32 is mounted around the lens unit 30. An inner diameter of the magnet 32 is slightly larger than the outer diameter of the top end of the lens barrel 310, but smaller than the outer diameter of the bottom end of the lens barrel 310. The magnet 32 is mounted over the annular supporting step 313 of the lens barrel 310, and the inner surface of the magnet 32 is fixedly affixed to the outer circumferential surface of the lens barrel 310.

Figure 4:
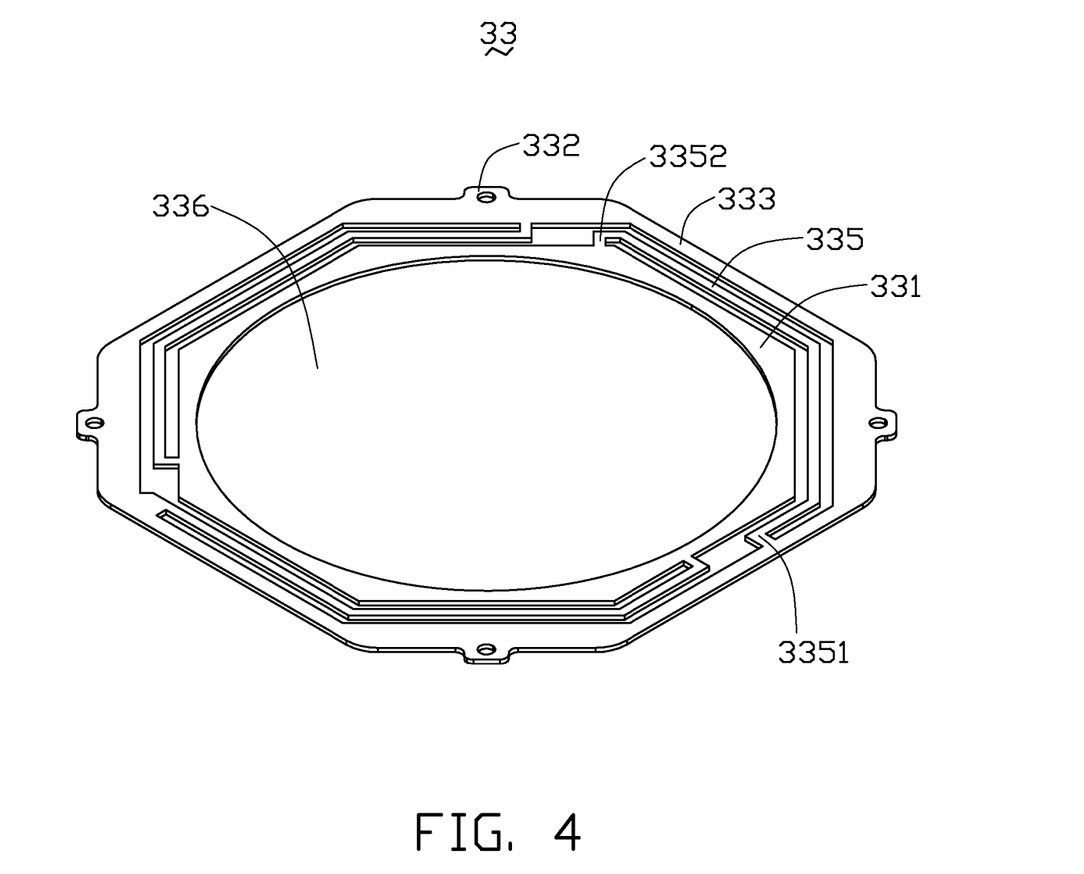
FIG. 4 is an isometric view of an elastic element of the camera module of FIG. 2.

An elastic element 33 is located just under the magnet 32 and mounted around the lens unit 30. Referring to FIG. 4, the elastic element 33 includes an inner ring 331, an outer ring 333 concentric with the inner ring 331, and three elastic ribs 335 integrally connecting the inner ring 331 with the outer ring 333. An outer periphery of the elastic element 33 is octagon-shaped and substantially the same as the outer periphery of each of the flanges 215a, 215b of the upper coil seat 21a and the lower coil seat 21b. The outer ring 333 and the inner ring 331 are spaced from each other along a radial direction. The elastic ribs 335 are evenly disposed along a circumferential direction of the elastic element 33 between the inner ring 331 and the outer ring 333. Each of the elastic rib 335 occupies approximately one third of a perimeter of the elastic element 33. Each of the elastic ribs 335 connects an outer periphery of the inner ring 331 with an inner periphery of the outer ring 333. The inner ring 331, the outer ring 333 and the elastic ribs 335 are coplanar to each other when the elastic element 33 is at a natural state. Four guiding tabs 332 horizontally and outwardly extend from four spaced sides of an outer periphery of the outer ring 333. Each of the guiding tabs 332 has a size which substantially equals to the size of each of the grooves 216 of the pairs of ears 217b of the lower coil seat 21b. Each of the elastic ribs 335 has a first end 3351 connected with the outer ring 333 and an opposite second end 3352 connected with the inner ring 331. A stiffness coefficient of the elastic element 33 along the radial direction of the elastic element 33 is larger than a stiffness coefficient of the elastic element 33 along an axial direction of the elastic element 33. In this embodiment, the elastic element 33 is made of copper, the stiffness coefficient of the elastic element 33 along the radial direction is $3*10^4$ n/m (newton/meter), and the stiffness coefficient of the elastic element 33 along the radial direction is one hundred times of the stiffness coefficient of the elastic element 33 along the axial direction.

Referring back to FIG. 3, the upper and the lower coils 22a, 22b are wound around the sidewalls 213a, 213b of the upper and the lower coil seats 21a, 21b, respectively. The lens unit 30 is received in the receiving space of the stator 20. The annular supporting step 313 of the lens barrel 310 is substantially coplanar with the flange 215b of the lower coil seat 21b. Both the magnet 32 and the elastic element 33 are mounted around the lens barrel 310 and received in the receiving room 26 between the flanges 215a, 215b of the upper and the lower coil seats 21a, 21b. The guiding tabs 332 of the elastic element 33 are engaged into the grooves 216 of the ears 217b of the lower coil seat 21b to prohibit rotation of the elastic element 33 and the lens unit 30. The outer ring 333 of the elastic element 33 is affixed to the flange 215b of the lower coil seat 21b. The inner ring 331 of the elastic element 33 is sandwiched between the magnet 32 and the supporting step 313 and affixed to a bottom surface of the magnet 32. The receiving room 26 has a height greater than a sum of the heights of the magnet 32 and the elastic element 33, so that the magnet 32 together with the lens unit 30 can move along an axial direction of the camera module between the flanges 215a, 215b of the upper and the lower coil seats 21a, 21b.

During operation, electric currents are applied to the upper coil 22a and the lower coil 22b respectively according to an image signal from the image sensor. The upper coil 22a and the lower coil 22b receive the electric currents and accordingly establish an induced magnetic field. The magnetic field of the magnet 32 interacts with the induced magnetic field of the upper and the lower coils 22a, 22b so that an upward magnetic force is generated. The magnetic force drives the lens unit 30 together with the magnet 32 into telescopic movement along the axial direction of the camera module. In other words, the lens unit 30 is driven to move upwardly along the axial direction of the camera module. The inner ring 331 and the second ends 3352 of the elastic ribs 335 move together with the lens unit 30. The outer ring 333 and the first ends 3351 of the elastic ribs 335 maintain still. Thus, the elastic ribs 335 of the elastic element 33 are elastically deformed along the axial direction, and a downward elastic force is accordingly generated by the upwardly elongated deformation of the elastic ribs 335. When the lens unit 30 moves to a position where the elastic force and the magnetic force reach a balance, the lens unit 30 is therefore stopped at that position, and a focusing action of the camera module is accomplished. When the image detected by the image sensor changes, the intensities of the electric currents applied to the upper coil 22a and the lower coil 22b are accordingly changed to control the lens unit 30 to move to a corresponding focus position.

Figure 5:
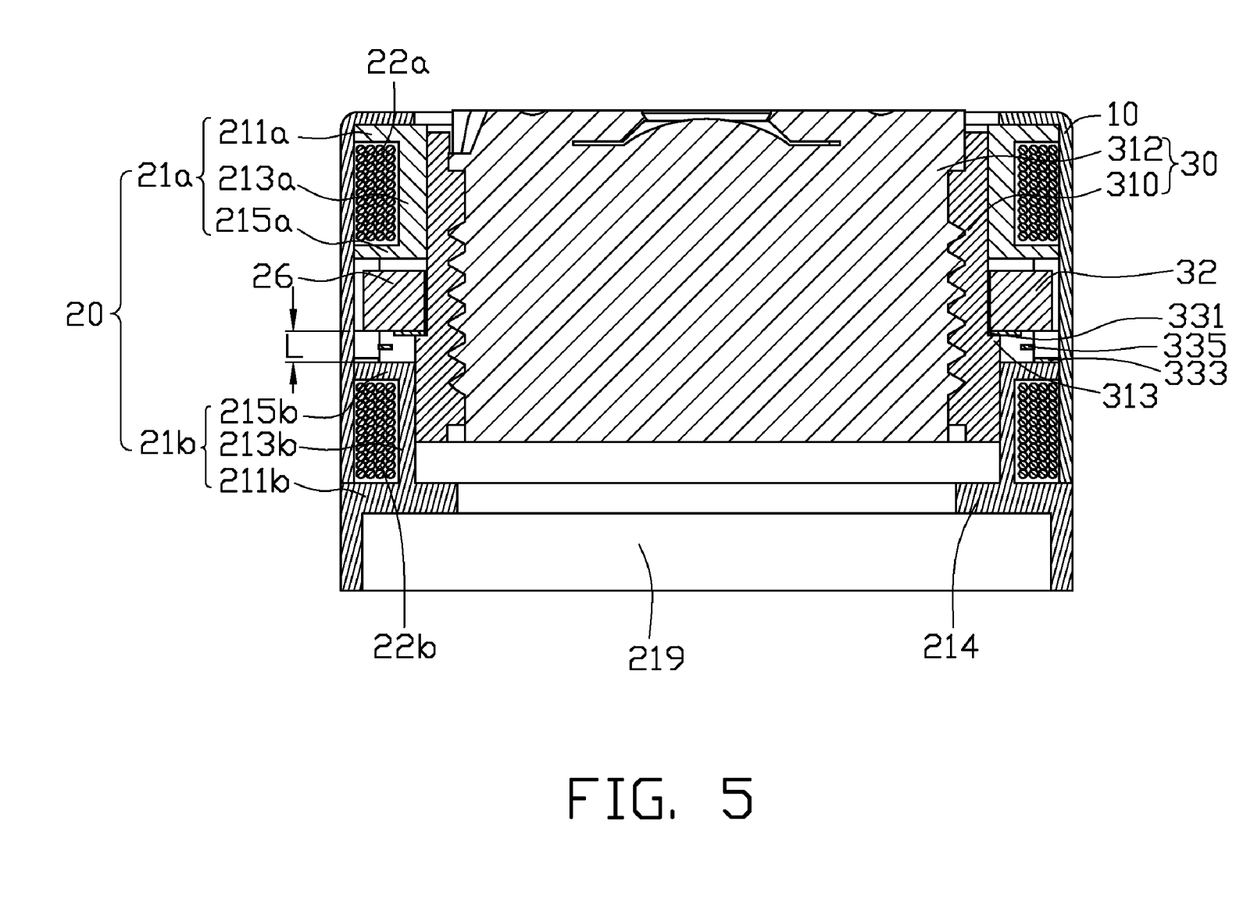
FIG. 5 is another cross-section view of the camera module of FIG. 1, wherein a lens unit stops at a corresponding focus position.

For example, during operation, an electric current of 0.4 A (ampere) is applied to each of the upper coil 22a and the lower coil 22b according to the image signal from the image sensor. The upper coil 22a and the lower coil 22b cooperatively establish an induced magnetic field. The induced magnetic field of the upper and the lower coils 22a, 22b interacts with the magnetic field of the magnet 32. Thus, a magnetic force is generated between the upper and the lower coils 22a, 22b and the magnet 32 to drive the lens unit 30 to move upwardly along the axial direction of the camera module. The second ends 3352 of the elastic ribs 335 of the elastic element 33 moves together with the lens unit 30 and the elastic ribs 335 are deformed. Referring to FIG. 5, when the lens unit 30 upwardly moves a distance L of 0.2 cm (centimeter) with respect to the flange 215b of the lower coil seat 21b, the second end 3352 of each elastic rib 33 also upwardly moves the distance L of 0.2 cm with respect to its first end 3351. If, at this stage, the elastic force generated due to the deformation of the elastic ribs 335 comes to a balance with the magnetic force generated by the interaction between the magnetic field of the magnet 32 and the induced magnetic field of the upper and the lower coils 22a, 22b, the lens unit 30 stops at its current focal position where the magnet 32 spaces 0.2 cm from the flange 215b of the lower coil seat 21b, as shown in FIG. 5.

In the present camera module, a mapping between the intensities of the electric currents applied to the upper and the lower coils 22a, 22b and the corresponding focus positions of the lens unit 30 is pre-established. The movement distance L (i.e., the distance between the corresponding focus position and the flange 215b of the lower coil seat 21b) of the lens unit 30 is controlled by the intensities of the electric currents applied to the coils 22a, 22b, while the intensities of the electric currents are determined according to the image detected by the image sensor. When the elastic force generated by the elastic element 33 and the magnetic force generated by interaction between the upper and the lower coils 22a, 22b and the magnet 32 reach a balance, the lens unit 30 is stopped at the corresponding focus position. Therefore, the magnet 32 is able to precisely stop at different positions between the flanges 215a, 215b of the upper and the lower coil seats 21a, 21b and the lens unit 30 is able to precisely stop at any desired focus positions of the camera module.

In addition, since the stiffness coefficient of the elastic element 33 along the radial direction is much larger than the stiffness coefficient of the elastic element 33 along the axial direction, the lens unit 30 is kept to move stably along the axial direction of the camera module. Thus, imbalanced movement of the lens unit 30 is avoided, so that the lens unit 30 can move smoothly and accurately to reach its focus position.

During operation of the present camera module, the second ends 3352 of the elastic ribs 335, which move together with the lens unit 30, function as movable ends, while the first ends 3351 which remain still with the stator 20, function as fixed ends. Alternatively, the moveable ends and the fixed ends of the elastic ribs 335 can be interchangeable. That is, the inner ring 331 of the elastic element 33 can be directly affixed to the flange 215b of the lower coil seat 21b, whilst the outer ring 333 of the elastic element 33 can be affixed to the bottom surface of the magnet 32. Thus, when the camera module operates, the first ends 3351 of the elastic ribs 335 move together with the lens unit 30 and function as the movable ends, and the second ends 3352 of the elastic ribs 335 remain still with the stator 20 and function as the fixed ends.

Figure 6:
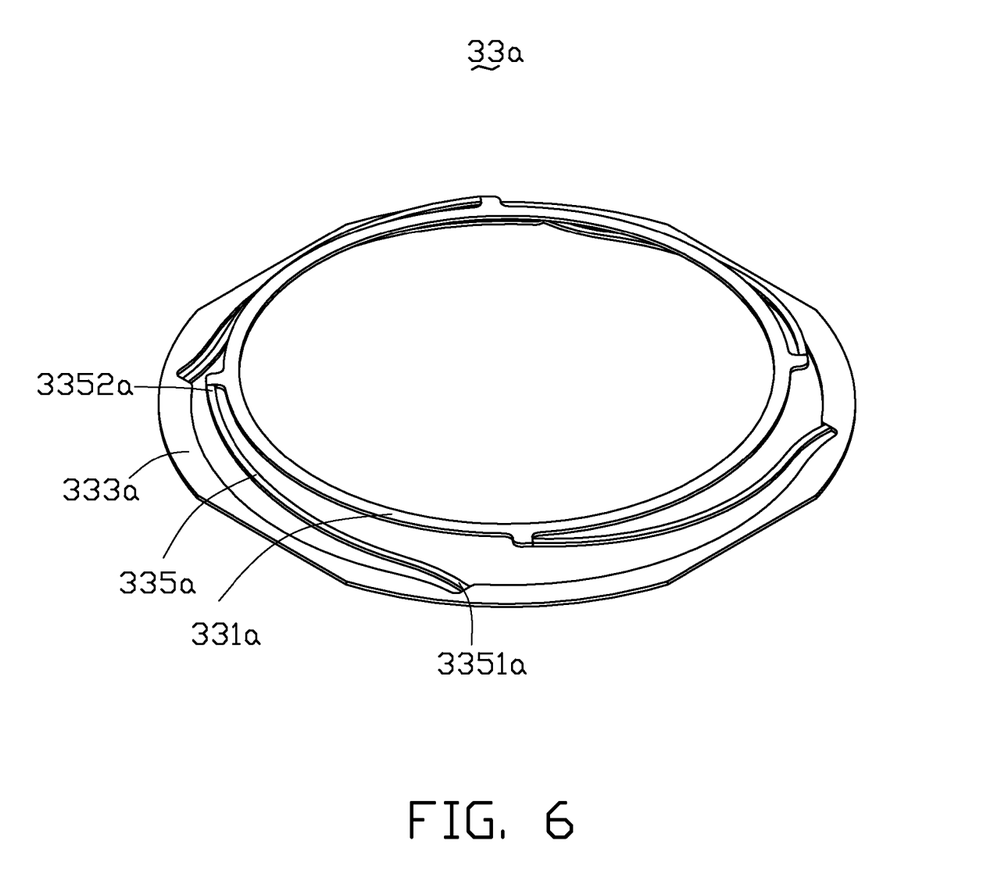
FIG. 6 is an isometric view of an elastic element in accordance with a second exemplary embodiment of the present invention.
Figure 7:
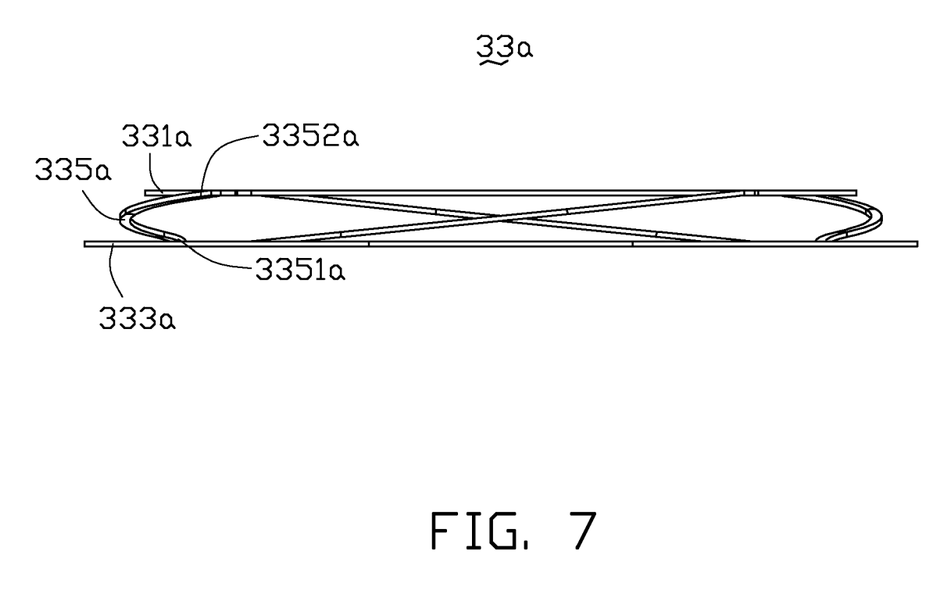
FIG. 7 is a front elevation view of the elastic element of FIG. 6.

FIG. 6 and FIG. 7 illustrate an elastic element 33a in accordance with an alternative embodiment. Similar to the first embodiment, the elastic element 33a also includes an inner ring 331a, an outer ring 333a and three elastic ribs 335a integrally connected the inner ring 331a with the outer ring 333a. The inner ring 331a and the outer ring 333a are spaced from each other along the radial direction of the elastic element 33a. Each of the elastic ribs 335a has a first end 3351a connected with the outer ring 333a and a second end 3352a connected with the inner ring 331a. The difference of the second embodiment over the first embodiment is that the inner ring 331a is higher than the outer ring 333a, so that a height difference along an axial direction of the elastic element 33a is formed between the inner ring 331a and the outer ring 333a when the elastic element 33a is at a natural state. Each of the elastic ribs 335a helically extends downwardly from the outer periphery of the inner ring 331a towards the inner periphery of the outer ring 333a.

Figure 8:
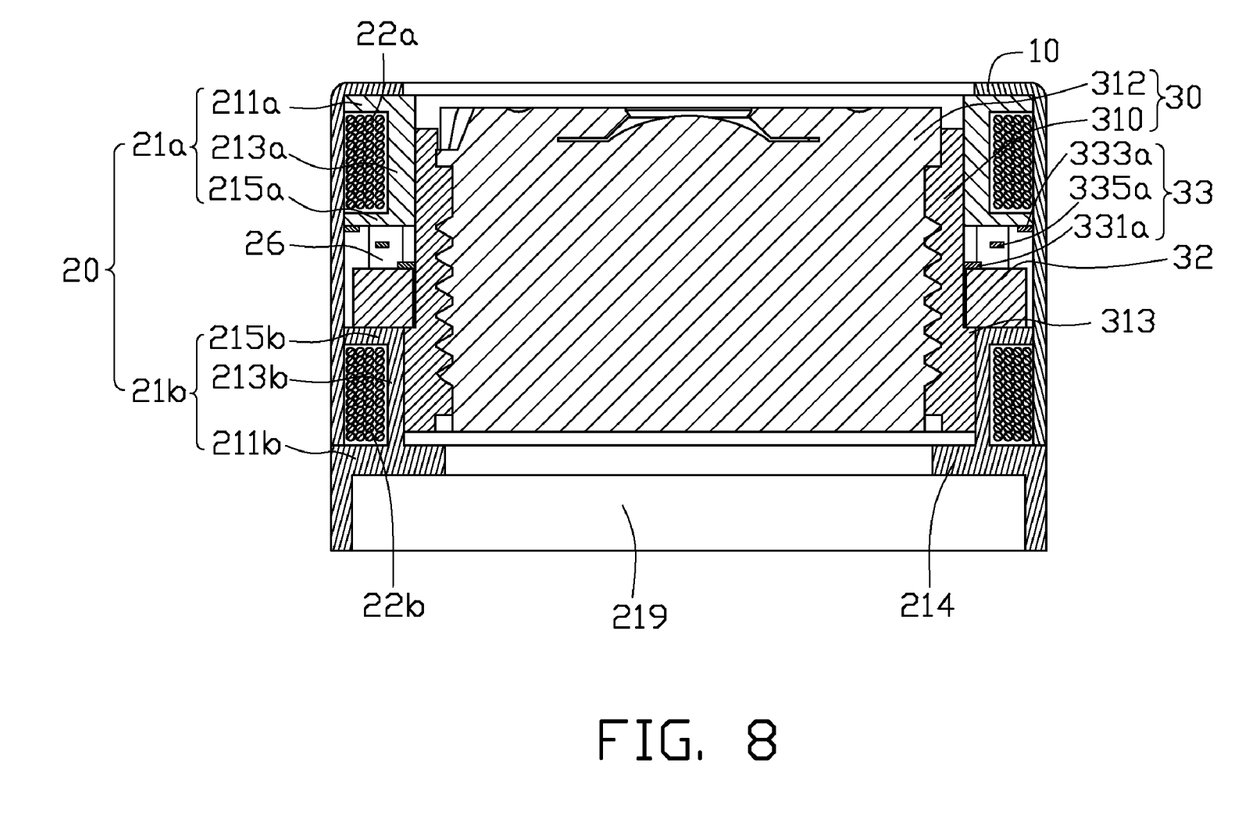
FIG. 8 is a cross-section view of a camera module using the elastic element of FIG. 6.

Referring to FIG. 8, a camera module using the elastic element 33a is shown. The magnet 32 and the elastic element 33a are mounted around the lens barrel 310 and received in the receiving room 26 between the flanges 215a, 215b of the upper coil seat 21a and the lower coil seat 21b. The elastic element 33a in FIG. 8 is positioned upside-down from the position of FIGS. 6 and 7. The outer ring 333a of the elastic element 33a is affixed to the flange 215a of the upper coil seat 21a, whilst the inner ring 331a of the elastic element 33 is affixed to a top surface of the magnet 32. The magnet 32 is fixedly mounted around the lens barrel 310 and supported by the supporting step 313 of the lens barrel 310. The magnet 32 is located just under the elastic element 33a. The height of the receiving room 26 substantially equals to the sum of the heights of the elastic element 33a and the magnet 32.

During operation, the electric currents having corresponding intensities are applied to the upper coil 22a and the lower coil 22b respectively according to the image signal from the image sensor. The upper coil 22a and the lower coil 22 establish an induced magnetic field after receiving the electric currents. The induced magnetic field of the upper and the lower coils 22a, 22b interacts with the magnetic field of the magnet 32 to generate an upward magnetic force which drives the lens unit 30 into telescopic movement along an axial direction of the camera module. As the lens unit 30 move upwardly, the elastic element 33a is compressed. The second end 3352a of each elastic rib 335a moves together with the lens unit 30 with respect to its first end 3351a and the elastic ribs 335a are deformed. An downward elastic force is generated by the elastic element 33a in response to the deformation of the elastic ribs 335a for stopping and maintaining the lens unit 30 at the desired focus position when the downward elastic force reaches to a balance with the upward magnetic force. Therefore, in this embodiment, the first end 3351a of each elastic rib 335a functions as the fixed end, and the second end 3352a of each elastic rib 335a functions as the moveable end.

Alternatively, the moveable ends and the fixed ends of the elastic ribs 335a can be interchangeable. That is, the elastic element 33a is inverted from the position of FIG. 8. The inner ring 331a of the elastic element 33a can be affixed to the flange 215a of the upper coil seat 21a, whilst the outer ring 333a of the elastic element 33a can be affixed to the top surface of the magnet 32. Thus, the first ends 3351a of the elastic ribs 335a move together with the lens unit 30 and function as the movable ends, and the second ends 3352a of the elastic ribs 335a remain still with the stator 20 and function as the fixed ends.

Figure 9:
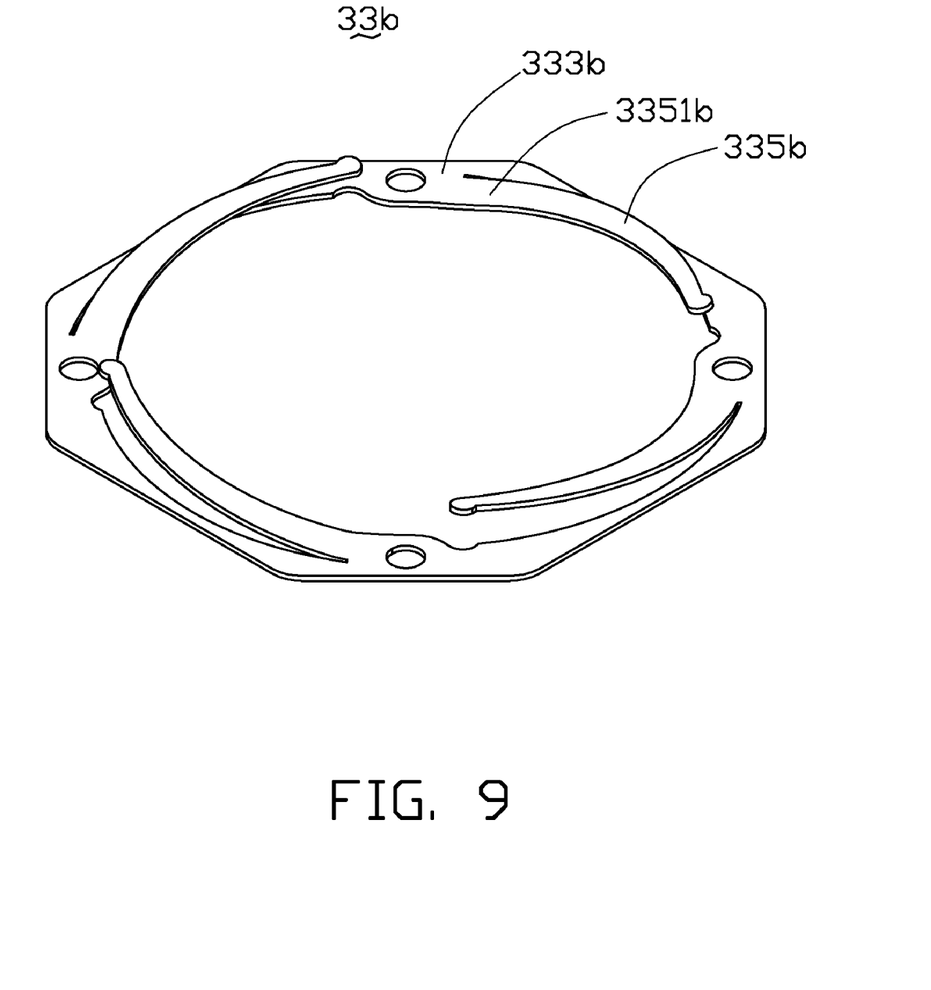
FIG. 9 is an isometric view of an elastic element in accordance with a third exemplary embodiment of the present invention.
Figure 10:
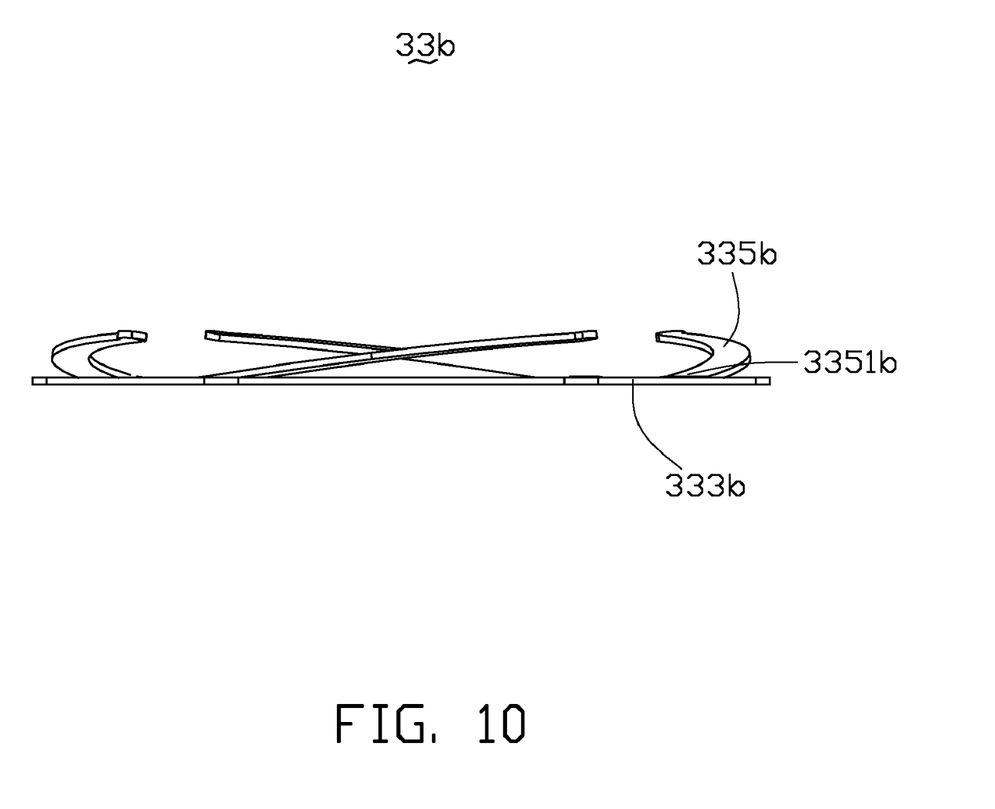
FIG. 10 is a front elevation view of the elastic element of FIG. 9.

FIG. 9 and FIG. 10 illustrate an elastic element 33b in accordance with another alternative embodiment. Similar to the second embodiment, the elastic element 33b also includes an outer ring 333b and three elastic ribs 335b helically extending upwardly from the inner periphery of the outer ring 333a. The difference of the third embodiment over the second embodiment is that the elastic element 33b has no inner ring, and each of the elastic ribs 335b has a first end 3351b connected with the outer ring 333b and a second free end 3352b remote from the outer ring 333b. In use, the elastic component 33b is positioned upside-down from the position of FIG. 10. The outer ring 333a is affixed to the stator 20, and the second free end 3352b of each elastic rib 335b is affixed to the magnet 32. Accordingly, the first end 3351b of each elastic rib 335b functions as the fixed end, and the second free end 3352b of each elastic rib 335b functions as the moveable end.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module comprising:
a lens unit comprising a lens barrel and a lens received in the lens barrel;
a magnet fixedly mounted around the lens barrel;
a stator receiving the lens unit and the magnet therein, the stator comprising an upper coil seat with an upper coil wound therearound and a lower coil seat with a lower coil wound therearound, the upper and the lower coils establishing an induced magnetic field when an electric current is applied thereto, the induced magnetic field of the upper and the lower coils interacting with a magnetic field of the magnet to generate a magnetic force driving the lens unit into a telescopic movement; and
an elastic element comprising at least one rib, the at least one rib comprising a fixed end connected with the stator and an opposite movable end, the moveable end of the elastic element moving together with the lens unit with respect to the fixed end of the elastic element to cause the at least one rib to deform and generate an elastic force during the telescopic movement of the lens unit, the lens unit stopping at a focal position when the magnetic force and the elastic force come to a balance.

2. The camera module of claim 1, wherein the elastic element comprises an inner ring and an outer ring concentric with the inner ring, the inner ring and the outer ring being spaced from each other along a radial direction of the elastic element, the at least one rib connecting the inner ring with the outer ring.

3. The camera module of claim 2, wherein the outer ring connects with the stator, the fixed end of the at least one rib connects with the outer ring, the inner ring connects with the magnet, and the moveable end of the at least one rib connects with the inner ring.

4. The camera module of claim 3, wherein the outer ring connects with one of the upper coil seat and the lower coil seat, and the inner ring connects with the magnet.

5. The camera module of claim 2, wherein the inner ring connects with the stator, the fixed end of the at least one rib connects with the inner ring, the outer ring connects with the magnet, and the moveable end of the at least one rib connects with the outer ring.

6. The camera module of claim 2, wherein the inner ring, the outer ring and the at least one rib are coplanar to each other when the elastic element is at a natural state.

7. The camera module of claim 6, wherein a supporting step is formed on an outer circumferential surface of the lens barrel, the inner ring of the elastic element is sandwiched between the magnet and the supporting step and affixed to a bottom surface of the magnet, and the outer ring of the elastic element is affixed to the lower coil seat.

8. The camera module of claim 6, wherein the inner ring of the elastic element is fixed to the lower coil seat and the outer ring of the elastic element is fixed to a bottom surface of the magnet.

9. The camera module of claim 2, wherein one of the inner and the outer rings is located at a higher level than the other one of the inner and the outer rings, and a height difference along an axial direction of the elastic element is formed between the inner ring and the outer ring when the elastic element is at a natural state.

10. The camera module of claim 9, wherein a supporting step is formed on an outer circumferential surface of the lens barrel for supporting the magnet thereon, the outer ring of the elastic element is affixed to the upper coil seat, and the inner ring of the elastic element is affixed to a top surface of the magnet.

11. The camera module of claim 9, wherein a supporting step is formed on an outer circumferential surface of the lens barrel for supporting the magnet thereon, the inner ring of the elastic element is affixed to the upper coil seat, and the outer ring of the elastic element is affixed to a top surface of the magnet.

12. The camera module of claim 2, wherein the at least one rib includes at least two ribs, the at least two ribs are evenly disposed along a circumferential direction of the elastic element between the inner ring and the outer ring.

13. The camera module of claim 1, wherein the elastic element comprises an outer ring connected with the stator, the fixed end of the at least one rib connecting with an inner periphery of the outer ring, the moveable end of the at least one rib being a free end and connected with the magnet.

14. The camera module of claim 1, wherein the upper coil seat comprises a cylindrical sidewall, a flange radially and outwardly extending from a bottom end of the sidewall and a top plate radially and outwardly extending from a top end of the sidewall, the lower coil seat comprises a cylindrical sidewall, a flange radially and outwardly extending from a top end of the sidewall and a base formed on a bottom end of the sidewall, the flanges of the upper and the lower coil seats facing toward each other and cooperatively forming an annular receiving room therebetween, the elastic element and the magnet being received in the receiving room.

15. The camera module of claim 14, wherein a plurality of ears downwardly extend from an outer periphery of the flange of the upper coil seat towards the lower coil seat, a plurality of pairs of ears upwardly extend from an outer periphery of the flange of the lower coil seat towards the upper coil seat, a plurality of guiding tabs are formed on an outer periphery of the elastic element, and a groove for receiving a corresponding guiding tab therein is defined in each pair of ears of the lower coil seat.

16. A camera module comprising:
a lens mount;
a lens unit comprising a lens barrel, a lens received in the lens barrel and a magnet fixedly mounted around the lens barrel;
a stator received in the lens mount and receiving the lens unit therein, the stator comprising an upper coil seat with an upper coil wound therearound and a lower coil seat with a lower coil wound therearound, the upper and the lower coils establishing an induced magnetic field when an electric current is applied thereto, the induced magnetic field of the upper and the lower coils interacting with a magnetic field of the magnet to generate a magnetic force driving the lens unit into a telescopic movement; and an elastic element comprising at least one rib extending along a circumferential direction of the elastic element, the at least one rib comprising a fixed end connected with the stator and an opposite movable end, the moveable end of the elastic element being fixed to and moving together with the lens unit to cause the at least one rib to deform and generate an elastic force during the telescopic movement of the lens unit, the lens unit stopping at a focal position when the magnetic force and the elastic force come to a balance.

* * * * *